United States Patent
Moore et al.

(10) Patent No.: US 9,067,156 B2
(45) Date of Patent: Jun. 30, 2015

(54) FILTER CARTRIDGE ASSEMBLY AND METHOD OF MANUFACTURE THEREOF

(75) Inventors: Jonathan D. Moore, Manchester, CT (US); Justin R. Pribanic, Broad Brook, CT (US); Timothy M. Sasur, Newington, CT (US)

(73) Assignee: Clarcor Engine Mobile Solutions, LLC, Franklin, TN (US)

( * ) Notice: Subject to any disclaimer, the term of this patent is extended or adjusted under 35 U.S.C. 154(b) by 528 days.

(21) Appl. No.: 13/371,562

(22) Filed: Feb. 13, 2012

(65) Prior Publication Data
US 2013/0206680 A1 Aug. 15, 2013

(51) Int. Cl.
*B01D 29/00* (2006.01)
*B01D 29/21* (2006.01)
*B01D 29/05* (2006.01)

(52) U.S. Cl.
CPC .......... *B01D 29/21* (2013.01); *Y10T 29/49826* (2015.01); *B01D 2201/291* (2013.01); *B01D 2201/305* (2013.01); *B01D 2201/4084* (2013.01)

(58) Field of Classification Search
CPC ........ B01D 29/21; B01D 29/88; B01D 29/90; B01D 29/92; B01D 2201/4084; B01D 2201/291; B01D 2201/295; B01D 2201/34; B01D 2201/0407; B01D 2201/302; B01D 2201/303; B01D 2201/304
USPC .......... 210/440, 497.01, 450, 493.2, 444, 443
See application file for complete search history.

(56) References Cited

U.S. PATENT DOCUMENTS

| | | | |
|---|---|---|---|
| 5,985,144 A | 11/1999 | Janik et al. | |
| 6,187,188 B1 | 2/2001 | Janik et al. | |
| 7,237,682 B2 * | 7/2007 | Reynolds et al. | 210/450 |
| 2006/0037908 A1 | 2/2006 | Parkins, Jr. | |
| 2007/0227963 A1 * | 10/2007 | Fick et al. | 210/433.1 |
| 2007/0267338 A1 | 11/2007 | Menez et al. | |

FOREIGN PATENT DOCUMENTS

| | | |
|---|---|---|
| JP | 2000176217 A | 6/2000 |
| WO | 2004069373 A1 | 8/2004 |
| WO | 2007140247 A2 | 12/2007 |

OTHER PUBLICATIONS

International Search Report and Written Opinion dated Dec. 24, 2012.

* cited by examiner

*Primary Examiner* — Nam Nguyen
*Assistant Examiner* — Madeline Gonzalez
(74) *Attorney, Agent, or Firm* — Alix, Yale & Ristas, LLP (57) ABSTRACT

A filter cartridge has a longitudinal axis. A cartridge housing has first and second shell portions. The first shell portion has a cartridge housing opening and an annular element retention lip which is disposed axially inward of the opening and coaxial with the longitudinal axis. The filter element has a first end cap, a second end cap, and a continuous ring of filter media disposed between the first and second end caps. The first end cap defines a fuel flow port which is coaxial with the longitudinal axis. A plurality of resilient element retention arms extend axially from the first end cap, and surround the fuel flow port. The arms terminate in retention barbs which are mateable with the annular lip. The resilient retention arms hold the retention barbs against the annular lip, suspending the filter element within the cartridge.

8 Claims, 7 Drawing Sheets

FILTER CARTRIDGE ASSEMBLY AND METHOD OF MANUFACTURE THEREOF

BACKGROUND

This disclosure relates generally to devices for filtering and separating liquids. More particularly, the present invention relates to fuel filters for removing foreign particles and separating water from fuel in an internal combustion engine.

It is well-documented that significant quantities of contaminants such as water and various abrasive particles are found in diesel fuel. In addition to corroding metal components, water may obstruct the fuel lines when environmental temperatures fall below freezing. Likewise, abrasive particles may damage sensitive engine components such as the fuel injection pump.

Fuel filter cartridges are a well-known solution for removing water and abrasive particles from diesel fuel before the fuel is pumped into sensitive engine systems. Prior art fuel filter cartridges typically have a housing which defines an axial opening at one end thereof to provide fuel communication between the fuel delivery system and a filter element disposed within the cartridge housing. Customarily, the cartridge housing comprises two separate shell portions, one of which defines the axial opening. Filter elements typically comprise a ring of fuel filter media and a pair of end caps. The filter media typically comprises non-woven material, while one end cap is typically an imperforate cover to which one end of the fuel filter media is permanently affixed.

Prior art filters are manufactured by affixing the ends of the filter media to first and second end caps. Typically the filter element is affixed to the shell portion defining the axial opening using an adhesive. After the adhesive cures, the filter cartridges are typically completed by joining the two shell portions. Use of adhesive to secure the filter element within the housing complicates cartridge manufacture. There is a need for a simple, robust means for securing a filter element within a cartridge housing.

SUMMARY

Briefly stated, in one embodiment the current disclosure is an improved fuel filter element. The filter element has a longitudinal axis and comprises a first (upper) end cap, a second (lower) end cap, and a continuous ring of filter media attached between the two end caps. The first end cap has a main body portion, which defines a fuel flow port. The fuel flow port is coaxial with the longitudinal axis of the filter element. A plurality of resilient filter element retention arms extend axially from the main body portion axially opposite the filter media. The arms surround the fuel flow port, and terminate in retention barbs.

Additionally, a filter cartridge housing is contemplated for use in connection with the improved fuel filter element disclosed herein. The cartridge housing also has a longitudinal axis and comprises first (upper) and second (lower) shell portions. The first shell portion has a cartridge housing opening and an annular element retention lip. The annular element retention lip is disposed axially inward of the opening of the cartridge housing and is coaxial with the cartridge's longitudinal axis.

The fuel filter element is mounted within the cartridge housing by affixing the filter element to the first shell portion. The fuel filter element is affixed by advancing the first end cap towards the first shell portion. As the first end cap is brought towards the first shell portion, the barbs of the first end cap ride over the element retention lip. Once the barbs ride past the lip, the barbs snap into the lip and, along with the arms, suspend the filter element within the cartridge housing.

The apparatus and method of the present disclosure provides advantages over and relative to the above discussed prior art. For example, the fuel filter element and associated filter cartridge disclosed herein provides reliable filtration of fuel, and a strong mechanical connection between the cartridge housing and filter element. The mechanical connection between the first end cap and the first shell portion provides strong retention forces, without the need for an adhesive connection between the element and the housing. Furthermore, the method of mounting the fuel filter element within the cartridge streamlines the cartridge manufacturing process and reduces the time required for assembly of a complete product. The disclosed configuration of the filter element and cartridge housing allows for complete pre-manufacture of the filter element before installation of the filter element into the housing, eliminating the use of adhesive within the housing. Other advantages and features of the present invention will become apparent to those skilled in the art from the following detailed description, from the claims, and from the accompanying drawings.

BRIEF DESCRIPTION

The present disclosure may be better understood and its numerous objects and advantages will become apparent to those skilled in the art by reference to the accompanying drawings in which.

DETAILED DESCRIPTION

With reference to the drawings wherein like numerals represent like parts throughout the several figures, a housing 12 and a filter element 14 are provided in connection with the fuel filter cartridge 10 disclosed herein. The filter element 14 is configured to create an improved connection between the cartridge 12 and element 14, in addition to simplifying the cartridge manufacturing process.

Figure 1:
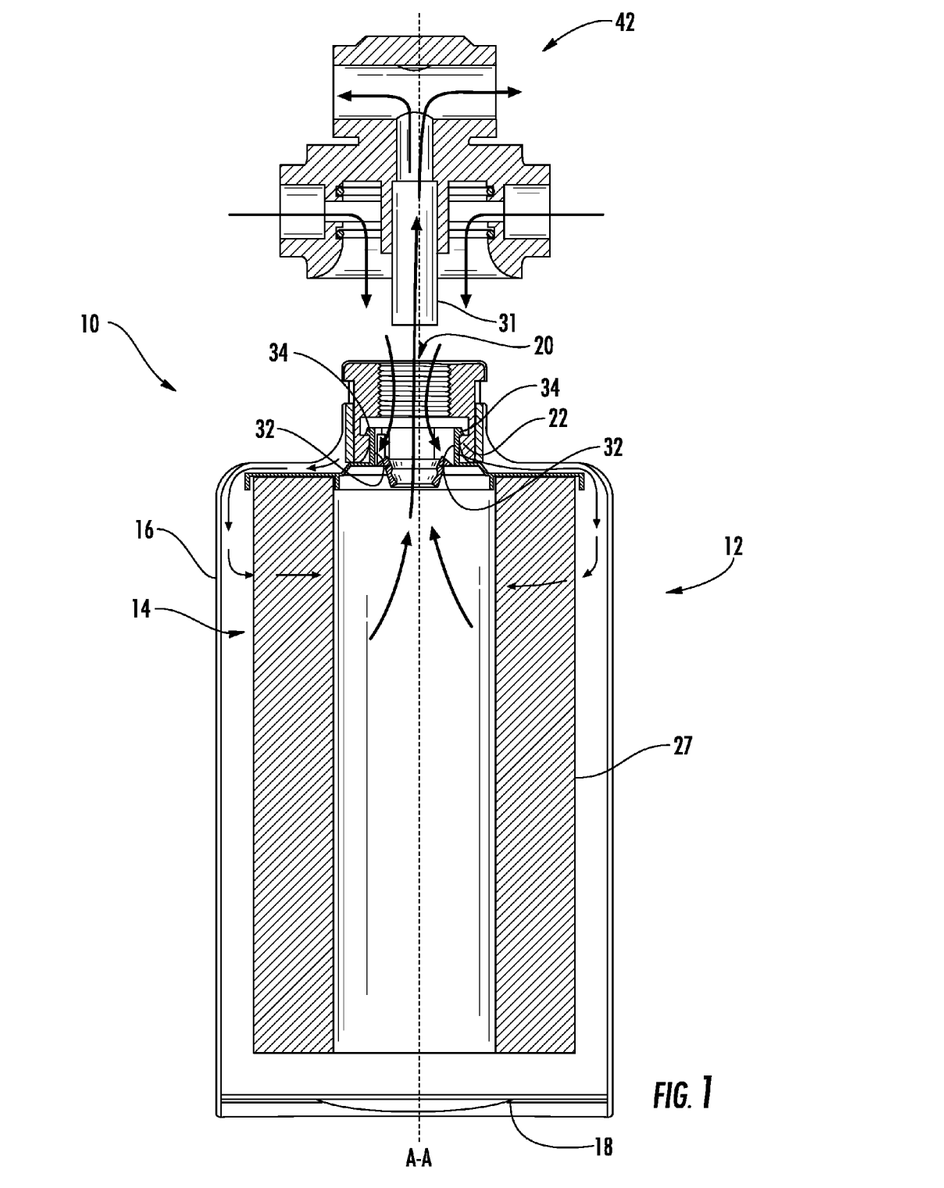
FIG. 1 is a cross-sectional view of one embodiment of the disclosed fuel filter cartridge shown with an accompanying fuel filter header.
Figure 7:
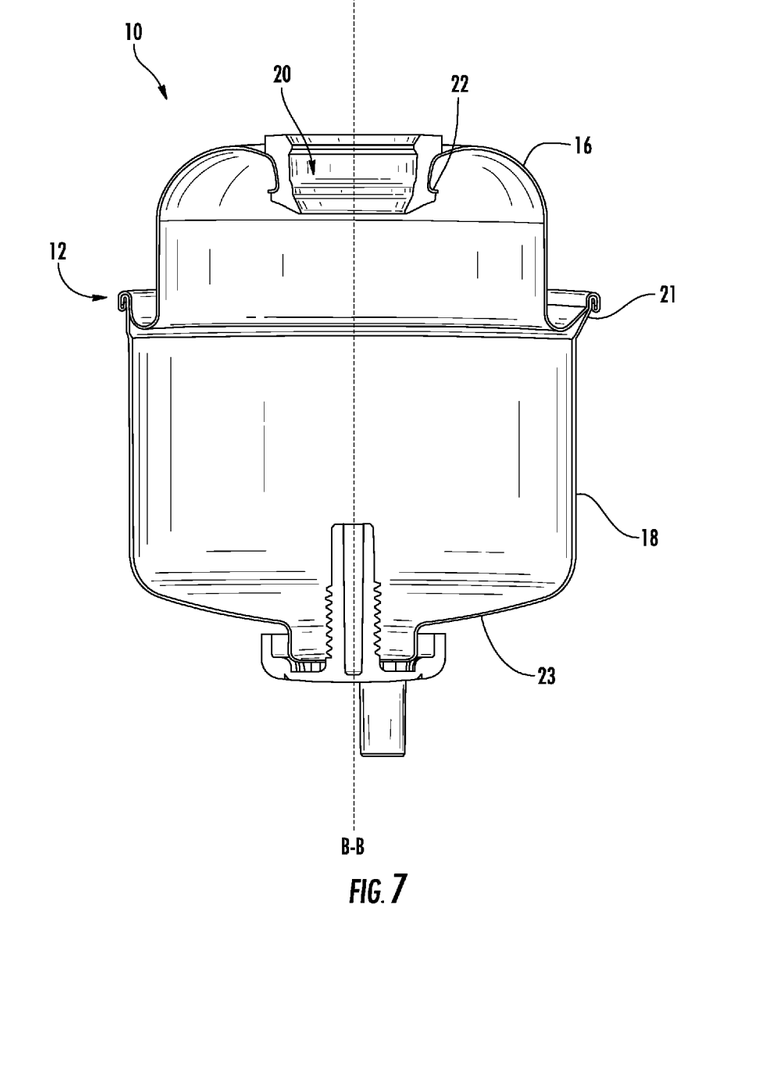
FIG. 7 is a cross sectional view of the embodiment of the first shell portion depicted in FIG. 4, further showing a second shell portion and a joint between the shell portions; a water waste outlet valve is additionally shown, while the filter element is omitted for clarity.

When completely installed, the filter element 14 is suspended within the cartridge housing 12. First (upper) and second (lower) cartridge shell portions (16 and 18 respectively) of the cartridge housing are connected after the filter element 14 is installed within the housing 12, to form a complete filter cartridge 10. As shown in FIG. 1, in one embodiment the first shell portion 16 is a unitary housing which extends the length of the filter cartridge. A second shell portion 18 is attached at an end opposite a cartridge housing opening 20. In an alternate embodiment shown in FIG. 7, the first shell portion 16 is attached to the second shell portion 18 at a joint 21. As shown in FIG. 7, the joint 21 of the embodiment is intermediate the opening 20 and a base 23 of the second shell portion.

Figure 2:
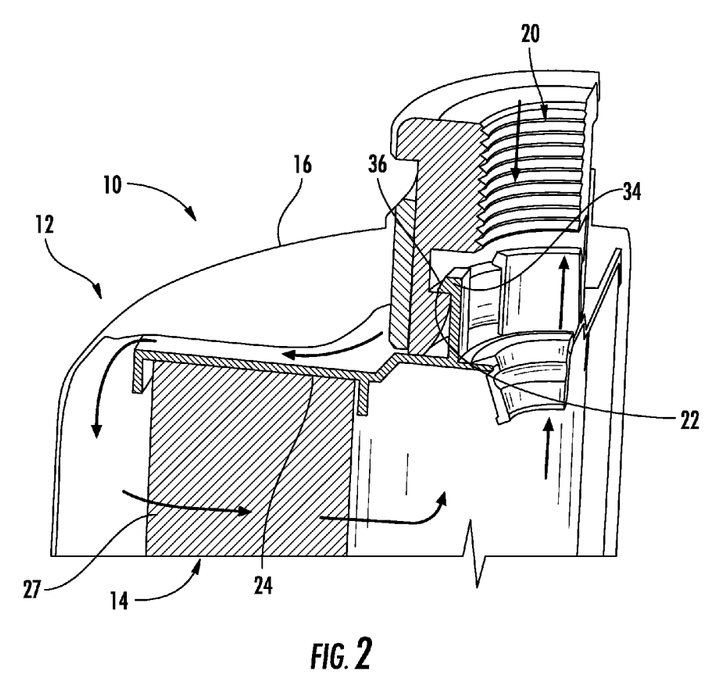
FIG. 2 is an enlarged cross-sectional view of the embodiment of the fuel filter depicted in FIG. 1.

The opening 20 in the first shell portion is located on a longitudinal axis of the cartridge. The opening 20 and first shell portion 16 may be configured to be compatible with any number of fuel filtration system mounts. An annular element retention lip 22 extends axially inward from the opening 20. As shown in FIGS. 1 and 2, in one embodiment of the fuel filter cartridge, the lip 22 projects radially toward a longitudinal axis A-A of the filter cartridge. In an alternate embodiment illustrated in FIGS. 3-7, the lip 22 projects radially away from a longitudinal axis of the first (upper) end cap B-B. As discussed below, the annular element retention lip 22 works in concert with a first end cap to suspend the filter element 14 within the housing 12.

Figure 4:
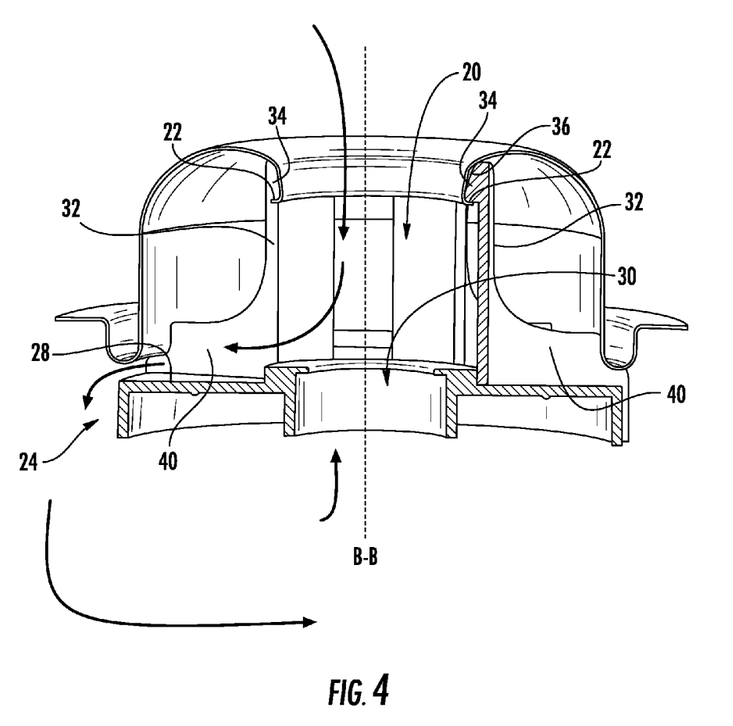
FIG. 4 is a cross sectional view of the embodiment of the first end cap of FIG. 3 as configured when the first end cap is installed in an alternate embodiment of the first cartridge shell portion; the second shell portion, second end cap, and filter media are omitted for clarity.
Figure 5:
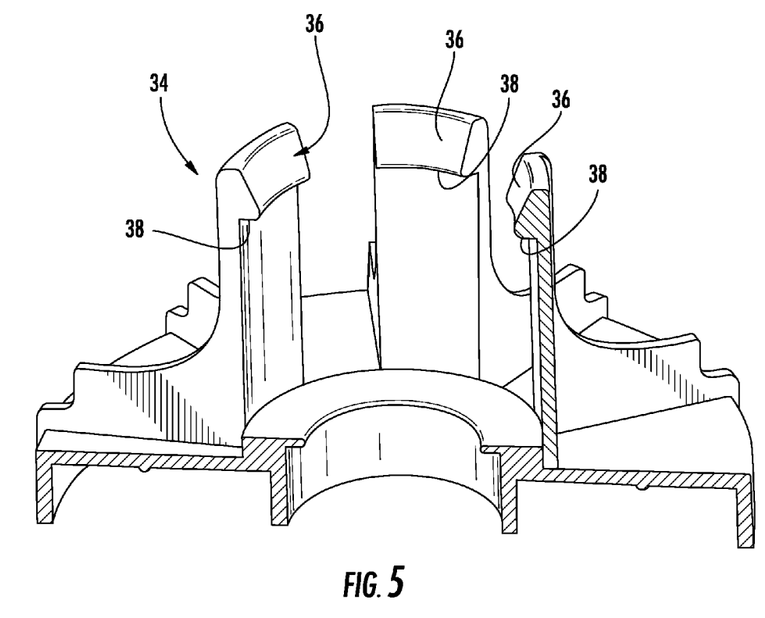
FIG. 5 is a close up of the embodiment of the filter cartridge first end cap depicted in FIG. 4; the first shell portion, second shell portion, second end cap, and filter media are omitted for clarity.
Figure 6:
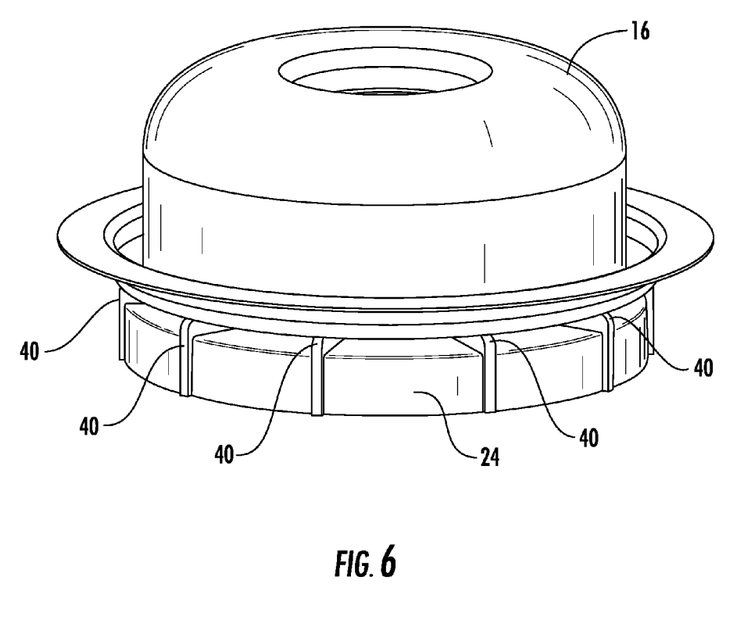
FIG. 6 is a perspective view of the embodiment of the first end cap and first shell portion of FIGS. 3-5; the second shell portion, second end cap, and filter media are omitted for clarity.

Referring to FIGS. 1 and 2, a continuous ring of filter media 27 extends between first (upper) and second (lower) end caps of the filter element (24 and 26 respectively). The filter media 27 may be constructed of cellulose paper or any other permeate fibrous material. As shown in FIGS. 1, 2, and 4, the first end cap 24 mechanically connects the filter element 14 to the fuel filter housing 12. A main body portion 28 of the first end cap is depicted surrounding a fuel flow port 30, which is located on the longitudinal axis B-B. The fuel flow port 30 is configured as a receptacle to receive a fuel outlet conduit 31, thus allowing fuel to exit the fuel filter cartridge 10.

As depicted in FIGS. 2-5, filter media retention arms 32 project axially from the main body portion 28 of the first end cap 24 at the perimeter of the fuel flow port 30. The set of filter element retention arms 32 surround the fuel flow port 30 in a circle coaxial with the longitudinal axes of the filter cartridge A-A and first (upper) end cap B-B. Depending on the pressure within the filtration environment, the characteristics of the filter media retention arms 32 may be adapted to ensure a more secure connection. As one of skill in the art will appreciate, increasing the width of the arms 32, increasing the thickness of the arms 32, or multiplying the number of arms 32 will increase the retention force the arms can exert on the retention lip 22.

Filter element retention barbs 34 project radially from the terminal end of the filter media retention arms 32. In the embodiment illustrated in FIG. 5, the barbs have an engagement ramp 36 oriented towards the annular lip 22 of the first shell 16 of the cartridge housing 12. Proceeding from the terminal end of the arms 34 and moving towards the main body portion 28, the barbs 34 increase in width while traveling along the engagement ramp 36. At the end of the engagement ramp 36 nearest the main body the barbs 34 terminate in a retention ledge 38. The ledge 38 shown in the figures is a flat surface that projects radially away from a surface of the arms 32 and abuts the engagement ramp 36. Like the arms, the characteristics of the ledge 38 and the annular lip 22 of the housing 12 may be altered to provide a more secure connection to the cartridge housing 12 in higher pressure filtration environments. For example, increasing the length of the ledge 38 and the radial width of the annular lip 22 will increase the retention forces exerted by the barbs 34 on the retention lip 22.

Figure 3:
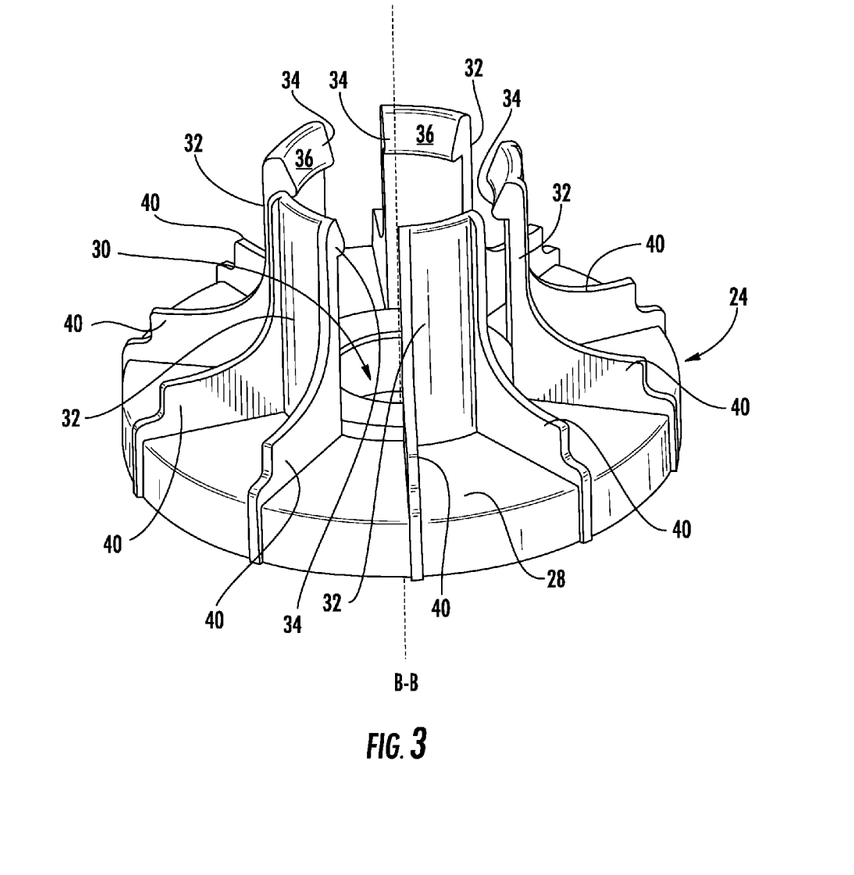
FIG. 3 is a perspective view of an alternate embodiment of a first (upper) end cap of the disclosed filter element, the cartridge housing, second end cap, and filter media are omitted for clarity.

As shown in FIG. 3, the barbs 34 may be located on the surface of the retention arms 32 oriented towards a longitudinal axis B-B of the first end cap 24. Thus, in this configuration, the ledge 38 projects radially toward the longitudinal axis B-B of the first end cap 24. In an alternate embodiment depicted in FIGS. 1 and 2, the barbs 34 are located on the surface of the arms 32 oriented away from longitudinal axis of the cartridge housing A-A. The alternate embodiments of the cartridge housing lip 22 are configured to cooperate with the alternate embodiments of the barbs 34. The embodiment of the housing where the lip 22 extends radially outwardly mates with the embodiment of the filter element where the ledge 38 extends radially inwardly, as shown in FIG. 4. The embodiment of the cartridge in which the lip 22 extends radially inwardly mates with the embodiment of the filter element in which the ledge 38 extends radially outwardly, as shown in FIGS. 1 and 2.

As shown in FIGS. 3-6, a plurality of support ribs 40 extend radially from the filter media retention arms. The support ribs 40 are connected to a surface of the arms 32 facing away from the fuel flow port 30 and provide biasing forces to aid in retention of the filter element 14 within the cartridge housing 12. In the embodiment illustrated in FIGS. 4 and 5, the support ribs exert forces biasing the arms toward the longitudinal axis B-B. Furthermore, in one embodiment where the ribs 40 extend from the arms 32 to a perimeter of the first end cap 28, the ribs 40 ensure that the first end cap 28 is centered within the first shell portion 16. By extending to the perimeter of the main body 28, the ribs 40 abut the first shell portion 16 when installed, preventing the first end cap 24 from moving from side to side within the cartridge housing 12.

In the embodiment in which the ribs 40 extend to the periphery of the main body portion 28, the ribs 40 also act to define a plurality of fuel flow pathways 42. For example, in FIG. 4 the ribs 40 extend to the periphery of main body portion 28 and abut the inside surface of the first shell portion 16. At the periphery, the ribs 40 are axially raised from the main body portion 28, creating a gap between the main body 28 and the first shell portion 16 of the cartridge housing. The ribs 40 define fuel flow paths extending radially outwardly across the main body of the first end cap.

Fluid flow through the filter cartridge 10 will now be described, where the fuel flow is indicated with arrows. In the embodiment of the filter cartridge depicted in FIGS. 1 and 2, unfiltered fuel enters the cartridge from the header 42. When installed, the fuel outlet conduit 31 of the header prevents unfiltered fuel from entering the fuel flow port 30. Fuel flows radially across the main body portion 28 through gaps in the filter media retention arms, and around the periphery of the main body portion 28. After flowing around the periphery, fuel flows radially inwardly through the filter element 27, and axially toward the fuel outlet conduit 31. Fuel then flows into fuel outlet conduit 31, and exits the header 42.

In the embodiment depicted in FIG. 4, fluid flows through the filter cartridge 10 in a similar pattern to the path described in connection with FIGS. 1 and 2. The embodiment of the filter cartridge 10 depicted in FIG. 4 is different, however, in that the ribs 40 aid in channeling fuel across the main body portion 28. The ribs 40 channel incoming fuel from the header (not shown) into the gap created between the main body 28 and the inside surface of the first shell portion 16. Thus, the ribs 40 channel unfiltered fuel around the periphery of the main body portion 28 and into the second shell portion (not shown). Once the fuel flows into the second shell portion (not shown), the fuel flows radially inwardly through the filter element (not shown). After the filter media 26 removes water and abrasive particles, fuel flows axially toward the outlet conduit (not shown) and exits the cartridge.

The configuration of the first end cap 24 and the first shell portion 16 facilitates assembly of fuel filter cartridges. When installing the first end cap 24 into the filter cartridge, the resilient filter element retention arms 32 provide a biasing spring-effect against the annular lip 22. As the first end cap 24 is installed the engagement ramps 36 of the filter element retention barbs 34 ride along the annular lip 22, radially flexing the retention arms 32 away from the annular lip 22. Once the annular lip 22 reaches the retention ledge 38, the biasing force of the retention arms 32 snap the barbs 34 into place, seating the retention ledge 38 of the filter element retention barbs 34 against the annular lip 22. Alternately, the support ribs 40 discussed above may provide additional biasing forces to facilitate installation and retention of the filter element 14 within the cartridge housing 12.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed:

1. A filter element having a longitudinal axis comprising:
    a first end cap having a main body, said main body defining a fuel flow port coaxial with said longitudinal axis, and a plurality of resilient filter element retention arms extending axially from said main body and surrounding said fuel flow port, said retention arms terminating in retention barbs,
    a second end cap, and
    a continuous ring of filter media having one end attached to said first end cap and an opposing end attached to said second end cap,
    wherein support ribs extend radially outwardly from said resilient filter element retention arms to a perimeter of said first end cap, to define a plurality of fuel-flow pathways directing fuel radially outwardly from said fuel flow port.

2. The filter element of claim 1, wherein said resilient filter element retention arms have an interior surface and an exterior surface, said interior surface comprising the surface of said arms facing toward said fuel flow port and said longitudinal axis, said exterior surface comprising the surface of said arms facing away from said fuel flow port and said axis, and said filter element retention barbs are located on the interior surface of said arms and project toward said axis.

3. The filter element of claim 1, wherein said resilient filter element retention arms have an interior surface and an exterior surface, said interior surface comprising the surface of said arms facing toward said fuel flow port and said longitudinal axis, said exterior surface comprising the surface of said arms facing away from said fuel flow port and said axis, and said filter element retention barbs are located on the exterior surface of said arms and project away from said axis.

4. A filter cartridge having a longitudinal axis comprising:
    a cartridge housing having first and second shell portions, said first shell portion having a cartridge housing opening and an annular element retention lip disposed axially inward of said opening and coaxial with said longitudinal axis;
    a filter element having a first end cap, a second end cap, and a continuous ring of filter media disposed between said first and said second end caps, said first end cap defining a fuel flow port coaxial with said longitudinal axis and a plurality of resilient element retention arms extending axially from said first end cap and surrounding said fuel flow port, said arms terminating in retention barbs mateable with said annular lip,
    wherein said resilient element retention arms hold said retention barbs against said annular lip suspending said filter element within said cartridge housing, support ribs extend radially outwardly from said resilient element retention arms to a perimeter of said first end cap, said support ribs defining at least one fuel-flow pathway directing fuel radially outwardly from said fuel flow port.

5. The filter cartridge of claim 4, wherein said resilient element retention arms have an interior surface and an exterior surface, said interior surface comprising the surface of said arms facing toward said fuel flow port, said exterior surface comprising the surface of said arms facing away from said fuel flow port, said annular lip projects away from a central axis of said cartridge housing opening, and said retention barbs are on the interior surface of said arms.

6. The filter cartridge of claim 4, wherein said resilient element retention arms have an interior surface and an exterior surface, said interior surface comprising the surface of said arms facing toward said fuel flow port, said exterior surface comprising the surface of said arms facing away from said fuel flow port, said annular lip projects towards a central axis of said cartridge housing opening, and said retention barbs are on the exterior surface of said arms.

7. The filter cartridge assembly of claim 4, wherein said support ribs define a plurality of fuel-flow pathways directing fuel radially outwardly from said fuel flow port.

8. The filter cartridge assembly of claim 4, wherein said barbs have an engagement ramp facing said lip, said engagement ramp generally increasing in thickness progressing from the terminus of the retention arms towards the first end cap, and an engagement ledge abuts said engagement ramp said engagement ledge terminating at said retention arms.

* * * * *